No. 788,151. PATENTED APR. 25, 1905.
T. P. HALL.
X-RAY METER.
APPLICATION FILED FEB. 15, 1904.
2 SHEETS—SHEET 1.
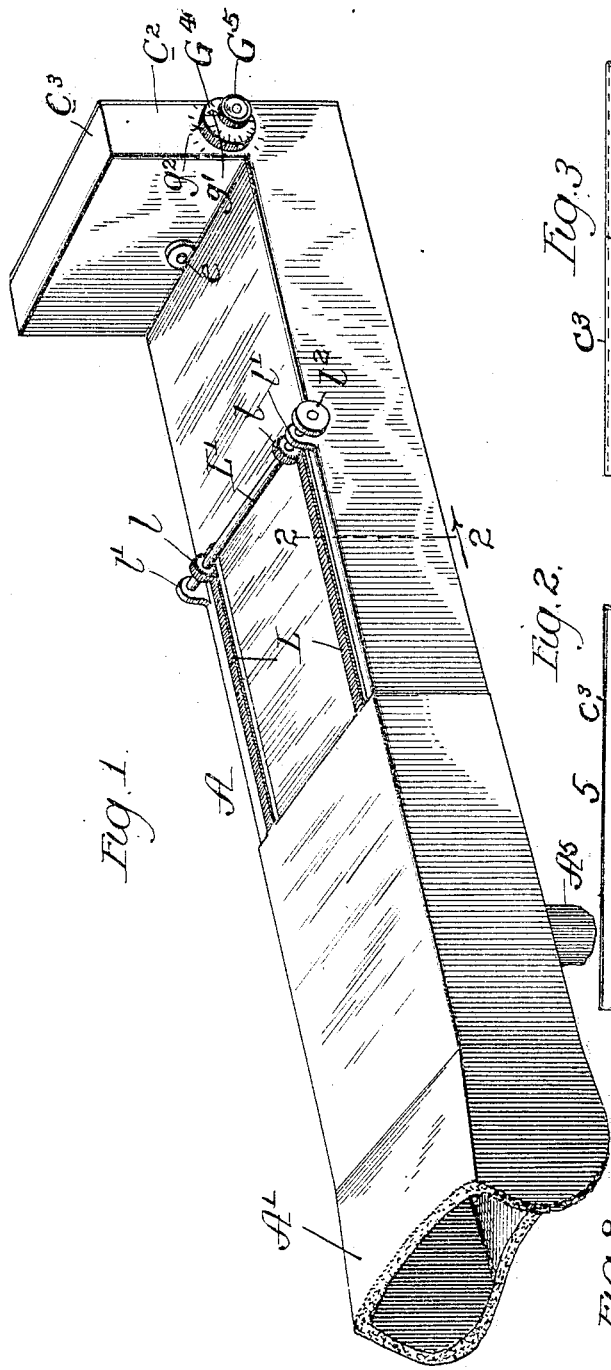
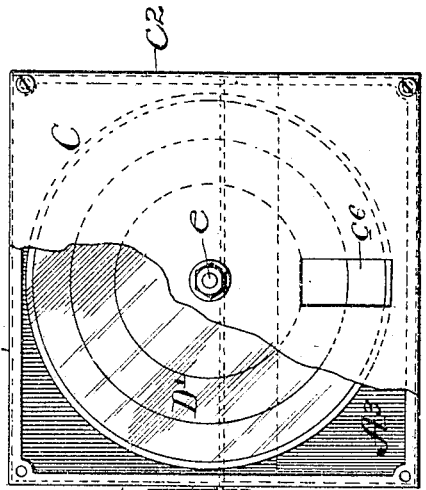
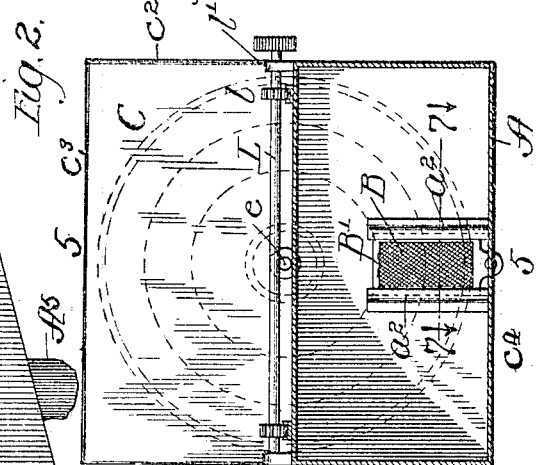
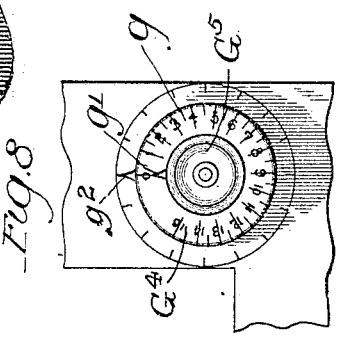
Witnesses
Inventor:
Thomas Proctor Hall
by Robert Brown
his Attys No. 788,151. PATENTED APR. 25, 1905.
T. P. HALL.
X-RAY METER.
APPLICATION FILED FEB. 15, 1904.
2 SHEETS—SHEET 2.
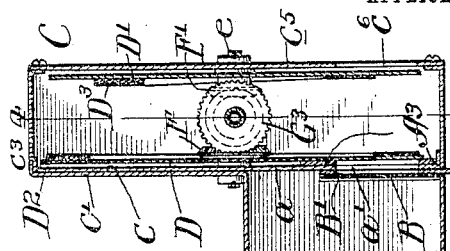
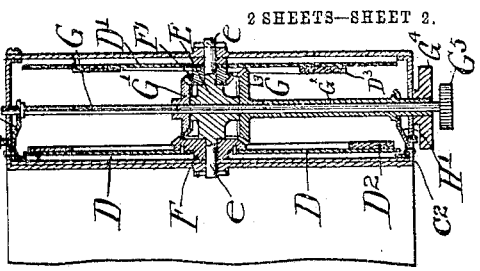
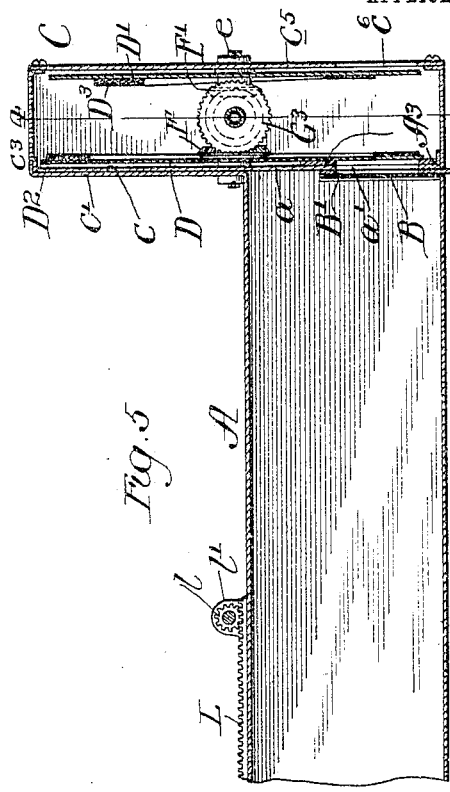
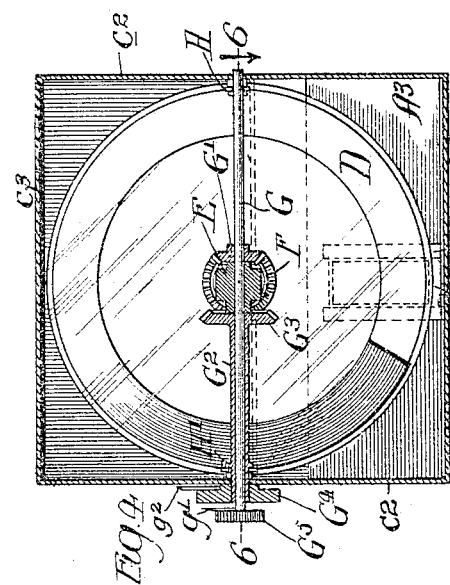
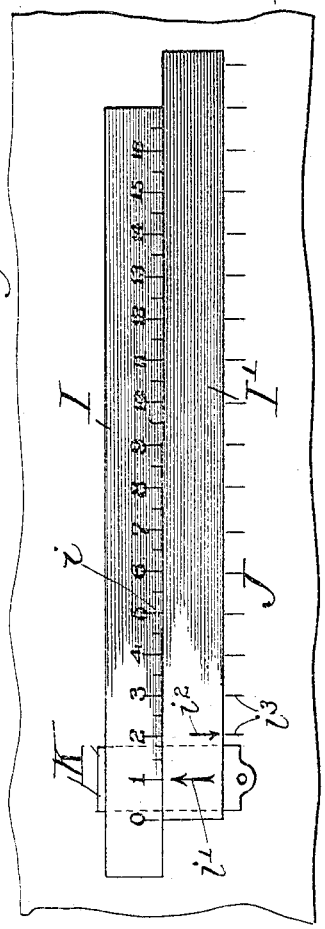

No. 788,151.

Patented April 25, 1905.

UNITED STATES PATENT OFFICE.

TOMAS PROCTOR HALL, OF CHICAGO, ILLINOIS, ASSIGNOR OF ONE-HALF TO SAMUEL T. HUTTON, OF CHICAGO, ILLINOIS.

X-RAY METER.

SPECIFICATION forming part of Letters Patent No. 788,151, dated April 25, 1905.

Application filed February 15, 1904. Serial No. 193,617.

*To all whom it may concern:*

Be it known that I, TOMAS PROCTOR HALL, a citizen of the United States, and a resident of Chicago, in the county of Cook and State of Illinois, have invented certain new and useful Improvements in X-Ray Meters; and I do hereby declare that the following is a full, clear, and exact description thereof, reference being had to the accompanying drawings, and to the letters of reference marked thereon, which form a part of this specification.

This invention relates to a device for measuring the penetration and is also adapted for measuring the intensity of X-rays.

The principal object of my invention is to produce a device of this character which is constructed to provide a standard of measurement by which the penetration of X-rays may be accurately determined, and a further object of the invention is to provide practicable mechanism for operating the essential elements of the device and to protect the same from outside or foreign rays.

It is a well-known fact that the penetration and intensity of X-rays are not correlative and that the intensity of the rays does not furnish a reliable guide to determine the penetrative power thereof. It is also a common observation that the quality of penetration of the rays of an X-ray tube vary greatly from time to time, so that the stated strength of a tube with respect to the penetration of its rays cannot be safely relied upon. The successful therapeutical use of X-ray tubes requires that the operator shall know at the time a tube is used its approximate penetration, and it is the principal purpose of this invention to produce a device which provides a standard of measurement which may be relied upon to accurately determine the penetration of the rays of a given tube at any given time and independently of the intensity of the same.

A device embodying the general and essential features of this invention embraces in general terms two strips or bodies of material of different degrees of opacity to X-rays and arranged in edge-to-edge relation in front of an opening in a box or tube, across which opening extends a fluorescent screen, the combined width of said strips covering said screen and so arranged that the rays traverse both the strips and strike the screen. Said strips may be termed "measuring" or "meter" strips. They are made of gradually-increasing thickness or gradually-increasing opacity, or both, from end to end thereof, thus increasing in geometrical ratio. The strips are movable relatively to each other and to the screen and are provided with means for determining their relative movement. For this purpose a graduated scale is associated with one of the strips and an indicator with the other, the parts being so arranged that when the indicator is opposite zero on the scale the rays that pass through the strips and strike the screen traverse equal thicknesses of the strips, and when the indicator is opposite a higher point on the scale the rays traverse a proportionately greater thickness of the less opaque strip. By reason of the different degrees of opacity of the two measuring-strips to X-rays, when said rays traverse equal thicknesses of said strips, as when the indicator of one of the strips is opposite the zero-mark of the scale of the other strip, the rays show with unequal effect on the upper and lower parts of the screen behind the strip. If now one of the strips—to wit, the less opaque strip—be moved relatively to the other and to the screen, while maintaining the transverse relation of said strips to each other and to the screen, in a manner to bring the thicker portion of the moved strip in front of the screen, the difference in the showing of the rays on the upper and lower parts of the screen is gradually decreased and a point is finally reached at which the rays traversing both strips show with equal effect on both parts or ends of the screen. The scale is now referred to and the number indicated thereon is applied to distinguish or classify the rays which have been measured, and such number is permanently applied to or associated with rays of that degree of penetration when measured in a like manner. For instance, if the indicator of one strip should stand opposite to the "No. 6" of the scale of the other strip, the penetration of the rays which have been measured is known as "No. 6." Obviously the same result will be secured if the strips be so made that instead of increasing in thickness a like variation in opacity be made. The experience or skill of the person applying said rays as a therapeutical agency will teach him the penetration of rays to be used for different purposes, and he is enabled by the use of a standard of measurement which this device provides to classify the rays relatively to their intended uses. For instance, he will know that a ray of a given penetration is beneficial for a certain ailment and that rays of greater penetration are necessary for deeper-seated ailments or for use in anatomical photography, and by the aid of such standard of measurement he is enabled to select from a collection of tubes one having the required penetration or to alter the conditions of an adjustable tube until its rays have the original penetration. If a No. 6 ray, for instance, is desired, a tube is selected the rays of which show with equal effect on both ends or parts of the screen when the scale indicates "No. 6." It is to be understood, however, that the relative opacity of the strips which the rays traverse need not be taken into consideration, inasmuch as the employment of such strips serves merely to provide a standard of measurement by which the penetration of X-rays may be conveniently thereafter measured by the use of the same or a like device, and after a standard of measurement has once been established that standard will thereafter be adhered to in the use of devices made in the same way. The two strips may be made of any suitable materials possessing different degrees of opacity. I have used with success tin and lead in foil form, the layers being laid upon each other to produce a laminated structure and in such manner that the strips increase in thickness in geometrical ratio from end to end thereof, as before stated.

Preferably the strips have the form of rings or annular members, which are so arranged that the strips bear an edge-to-edge relation to each other in at least that part of their length which at any time stands or is moving in front of the screen. If the rings be coaxial, as herein shown, one of the rings is of less diameter than the other, and its outer margin bears an edge-to-edge relation to the inner margin of the larger ring. Conveniently the annular strips are mounted on parallel disks, which are connected with suitable mechanism for rotating the same relatively to each other and constructed also to rotate the same together when desired, and said disks are so mounted with respect to the screen that during the rotation of the disks the strips move past the screen. The disks are preferably made of a transparent material, so as to afford no impediment to the rays, sheet-celluloid being an approved material for this purpose. The manner of mounting said measuring-strips and of moving the same relatively to each other and to the screen may, however, so far as the essential features of my invention is concerned, be accomplished by mechanism differing widely in its structural details. The mechanism herein shown is an approved and practical one and is made the subject of claims hereinafter.

Referring now to the drawings illustrating a crude embodiment of my invention, Figure 1 is an exterior perspective view of a device embodying my invention. Fig. 2 is a cross-section thereof, taken on line 2 2 of Fig. 1. Fig. 3 is a front end elevation thereof with parts broken away. Fig. 4 is a transverse vertical section taken on line 4 4 of Fig. 5. Fig. 5 is a partial longitudinal vertical section taken on line 5 5 of Fig. 2. Fig. 6 is a horizontal transverse section taken on line 6 6 of Fig. 4. Fig. 7 is a detail section taken on line 7 7 of Fig. 2. Fig. 8 is a side elevation of the actuating mechanism for the disks carrying the annular measuring-strips and showing a convenient form of scale for said strips. Fig. 9 is a view, diagrammatic in its nature, showing a modified arrangement of the measuring-strips.

As shown in said drawings, A designates a light-excluding tube or box, which is provided at one end with an eyepiece A′, suitably shaped to fit the face of the user, and is provided in its opposite end wall $a$, near the bottom thereof, with an opening $a'$, across which extends a fluorescent screen B. Said screen is preferably contained in a removable holder B′, which has sliding engagement with ways or grooves $a^2$, Figs. 2 and 5, formed on the inner face of the end wall of the tube, the holder, with the screen, being adapted to be removed and inserted into place through a suitable opening in the tube.

C designates as a whole an enlarged casing at the end of the tube remote from the eyepiece and which incloses said screen and contains the annular measuring-strips. Said casing extends above said tube and the rear wall of the casing above the tube is formed part by a continuation $c$ of the end wall of the tube and part by a continuation $c'$ of the top wall of the tube, and the side and top walls of said casing $c^2$ $c^3$, respectively, are shown as formed by extensions of the side walls of the tube, while the bottom wall $c^4$ is formed by an extension of the bottom wall of the tube. The front wall $c^5$ of said casing is attached at its margins to the margins of the top, bottom, and side walls thereof. Said front wall of the casing is provided with an opening $c^6$ in alinement with the opening in the end wall of the tube. The source of the rays to be measured is located in front of the device and the rays pass into said device through said opening $c^6$ and strike the screen after penetrating the measuring-strips, it being understood that the device is held to the face of the user and pointed or directed toward the source of the rays to be measured. Conveniently the tube or box is provided with a handle $A^5$, by which it is handled when in use. The walls of the tube and casing are such as to prevent any substantial penetration thereof by the rays. A stop-screen $A^3$, made of lead or like material, may, however, be located in front of the end wall $a$ of the tube and having an opening in front of the screen B to prevent rays from striking the screen except those passing through the measuring-strips.

D D′ designate two parallel disks upon which are mounted the two annular strips $D^2$ $D^3$, the strip $D^2$ on the rearmost disk D being located adjacent to the margin of said disk D and the strip $D^3$ on the forward disk being mounted inside of the margin thereof a distance substantially equal to the width of the strip $D^2$. As herein shown, said disks are arranged coaxially and the edge-to-edge of the annular strips is preserved throughout the circumference of the smaller strip. The measuring-strips $D^2$ $D^3$ are so disposed that the outer margin of the larger strip extends to the bottom of the screened opening $a'$, and the outer margin of the smaller strip is in substantial circular alinement with the inner margin of the larger strip, and the inner margin of the smaller strip extends to or above the top of the screen-opening, so that the combined widths of said strips are equal to or slightly greater than the depth of the openings $a'$ $a^6$. The rays which pass through said opening $a^6$ traverse the lower parts or segments of the annular measuring-strips and strike the screen B, and said strips are made of such width that all of the rays striking the screen shall pass through one or the other of said strips. Referring now to the manner of mounting said strips D D′ and for rotating the same to move the measuring-strips carried thereby relatively to each other and to the screen, said parts are made as follows: E designates a stationary bearing member located between said disks D D′ and provided with oppositely-extending short shafts $e$ $e$, one of which extends through and is secured to the rear wall of the casing and the other of which extends through and is secured to the front wall of the casing. F F′ designate two beveled gear-wheels which are rotatively mounted on said shafts $e$, and to the rear one of which is attached the rear disk carrying the measuring-strip $D^2$, and to the forward one of which is attached the forward disk carrying the measuring-strip $D^3$, said disks rotating with said gear-wheels. G designates a shaft extending horizontally through the casing at right angles to the shafts $e$ and having rotative bearing at its ends in the side walls $c^2$ of the casing and at its intermediate portion in the bearing E. Affixed to said shaft is a beveled gear-wheel G′, which is made of the same size as and meshes with the gear-pinion F′. $G^2$ designates a hollow shaft which surrounds one end of the shaft G and is provided at its inner end with a beveled gear-wheel $G^3$, which is made of the same size as and meshes with the beveled gear-wheel F. Said hollow shaft $G^2$ extends through one of the side walls of the said casing and is provided outside of said wall with a turning-wheel $G^4$, and the shaft G extends entirely through the hollow shaft and through said turning-wheel $G^4$ and is provided at its outer end with a like turning-wheel $G^5$. Inasmuch as the gear-wheels $G^3$ and F are made larger than the gear-wheels G′ and F′, the wheels which do not mesh with each other have no contact and do not interfere with the action of the other. In order to maintain the coacting gear-wheels in proper meshing relation notwithstanding wear thereof, the two shafts G $G^2$ are shown as subjected to endwise pressure, which is accomplished, as herein shown, by means of springs H H′, attached to the side walls of the casing and bearing against shoulders on said shafts in the manner clearly shown in Fig. 6. Such proper intermeshing engagement of the gear-wheels is of importance, inasmuch as slight inaccuracy of fit or mesh would tend to derange the parts to such extent as to render its ray-measuring function unreliable. The springs H H′ have also the further function of a brake to prevent the shafts G G′ and the measuring-strips operated thereby from accidentally turning or rotating after they have once been adjusted.

A convenient manner of providing the disks with a scale whereby the relative rotation of the disks may be readily determined is shown in Fig. 8. As therein shown, the hand disk or wheel $G^4$, attached to the shaft $G^2$, which latter operates the rearmost measuring-strip, is provided on its outer face with a graduated scale $g$, Fig. 8, and the other hand wheel or disk $G^5$ is provided with a pointer $g'$, which coöperates with said scale. This scale is so arranged with respect to the measuring-strips that when the indicator $g'$ is located opposite zero-point on the scale $g$ the parts of said strips horizontally opposite to each other are of the same thickness, so that the rays passing through the opening $c^6$ and falling on the screen traverse equal thicknesses of said strips. After the shaft $G^2$ has been rotated to bring the indicator $g'$ opposite a higher number on the scale the part of the strip $D^3$ rotated thereby and which is the less opaque strip located horizontally opposite the other strip is correspondingly thicker. Inasmuch as both strips increase in a like ratio the relative thickness of the strips bears a like relation throughout the entire length thereof.

The intensity of rays may be measured by the device with reasonable accuracy in the following manner. Both strips are rotated together while the rays are passing therethrough in a manner to gradually increase the thickness of the strips through which the rays pass until the rays are almost excluded from the screen. A scale consisting of a pointer $g^2$ on the hand-wheel $G^4$ of the tubular disk-actuating shaft and an annular graduated scale marked on the end wall of the casing indicates by number the intensity of the rays. It will be understood that before the measuring-strips are thus moved together in front of the screen to measure intensity the strips will have been adjusted to show equality of penetration on the screen and having been once so adjusted will in the coaxial form herein shown retain that adjustment.

In Fig. 9 is shown straight measuring-strips I and I', which are located transversely across the opening in the casing J, containing the screen K, and said strips are adapted to be moved endwise when measuring X-rays traversing the same and falling on said screen. One of the strips is provided with a scale $i$ and the other with an indicator $i'$, and one of the strips is provided with an indicator $i^2$, which coöperates with a scale $i^3$ on the casing, which scales and indicators serve the same functions as do the like parts before described.

Preferably the light-excluding tube is made longitudinally extensible and contractible in order to accommodate it to the visions of different users. For this purpose the tube is made of two telescopic parts, one of which is provided with one or more racks L and the other with a transverse shaft L', provided with gear-pinions $l$, meshing with said racks, whereby one of said sections may be moved longitudinally relatively to the other. As herein shown, said mechanism is located on the top wall of the tube, the shaft L' being mounted in bearing-lugs $l'$, rising from the top of said tube. The shaft is provided with a hand-wheel $l^2$, by which it may be rotated.

I claim as my invention—

1. In a device for measuring X-rays, a screen and two measuring-strips of different opacity to X-rays extending in front of said screen and movable relatively to each other.

2. In a device for measuring X-rays, a screen and two measuring-strips of different opacity to X-rays extending in front of said screen and movable relatively to each other and to the screen.

3. In a device for measuring X-rays, a screen, two relatively movable measuring-strips extending in front of said screen, said strips being of different opacity to X-rays and each of gradually-increasing opacity from one end to the other.

4. In a device for measuring X-rays, a screen and two relatively movable measuring-strips of different opacity to X-rays, extending in front of said screen, said strips increasing in thickness from end to end.

5. In a device for measuring X-rays, a screen and two measuring-strips of different opacity to X-rays extending in front of said screen, the thickness of said strips increasing in a ratio of geometrical progression from end to end thereof.

6. In a device for measuring X-rays, a screen and two measuring-strips of different opacity to X-rays extending in front of said screen, the thickness of said strips increasing in a ratio of geometrical progression from end to end, and said strips being movable relatively to each other.

7. In a device for measuring X-rays, a screen and two relatively movable measuring-strips of different opacity to X-rays extending in front of said screen in edge-to-edge relation and entirely covering said screen.

8. In a device for measuring X-rays, a screen and two measuring-strips of different opacity to X-rays extending in front of said screen in edge relation and entirely covering said screen, said strips increasing in thickness from end to end and being movable relatively to each other.

9. In a device for measuring X-rays, a screen and two measuring-strips of different opacity to X-rays extending in front of the screen, said strips being movable relatively to each other, and a scale associated with said strips for determining the relative movement thereof.

10. In a device for measuring X-rays, a screen, two measuring-strips of different opacity to X-rays extending in front of the screen, said strips being movable relatively to each other and to the screen, a scale associated with the strips for determining the relative movement thereof, and a second scale associated with one of the strips and a stationary part of the device for determining the extent of movement of the strips relatively to the screen.

11. In a device for measuring X-rays, a screen and two annular measuring-strips of different opacity to X-rays and both arranged to move in front of the screens with their parts in edge-to-edge relation in a manner to cover the screens.

12. In a device for measuring X-rays, a screen and two annular measuring-strips of different opacity to X-rays and both arranged to move in front of the screen with their parts in edge-to-edge relation in a manner to cover the screen, said strip being made of increasing thickness from end to end.

13. In a device for measuring X-rays, a screen and two annular, coaxial measuring-strips of different opacity to X-rays and of different diameters and arranged to pass by rotation thereof in front of the screen, and to cover an edge-to-edge relation of said screen.

14. In a device for measuring X-rays, a screen and two annular measuring-strips, of different opacity to X-rays and of different diameters and the smaller one located radially inside the other, said strips being arranged to pass by rotation thereof in front of the screen, and the strips being made of increasing thickness from end to end and movable relatively to each other.

15. In a device for measuring X-rays, a screen and two independently-rotative disks in front of said screen and each carrying an annular measuring-strip which strips are designed to pass in front and cover in edge-to-edge relation said screen, said strips being of different opacity to X-rays.

16. In a device for measuring X-rays, a screen and two independently-rotative, coaxially-disposed disks in front of the screen, and each carrying an annular measuring-strip, said strips being of different opacity to X-rays and one located radially within the other in edge-to-edge relation and covering by their combined widths the screen.

17. A device for measuring X-rays, comprising an opaque tube or box provided in its wall with an opening, a screen extending across said opening, and two measuring-strips extending in front of said screen of different opacity to X-rays, said strips being made of increasing opacity from end to end and movable relatively to each other.

18. A device for measuring X-rays, comprising an opaque tube or box provided in its wall with an opening, a screen extending across said opening, and two measuring-strips extending in front of said screen, of different opacity to X-rays, said strips being made of increasing thickness from end to end and movable relatively to each other.

19. A device for measuring X-rays, comprising an opaque tube or box provided in its wall with an opening, a screen extending across said opening, annular measuring-strips of the character set forth adapted to pass in front of said screen in edge-to-edge relation and means for rotating said strips relatively to each other.

20. A device for measuring X-rays, comprising an opaque tube or box provided in its wall with an opening, a screen extending across said opening, annular measuring-strips of the character set forth adapted to pass in front of said screen in edge-to-edge relation, and gear-wheels associated with and independently rotating said strips and provided with actuating-shafts extending outside of said tube or box.

21. A device for measuring X-rays, comprising an opaque tube or box provided in its wall with an opening, a screen extending across said opening, annular measuring-strips of the character set forth adapted to pass in front of said screen in edge-to-edge relation, a gear-wheel associated with and independently rotating said strips and provided with actuating-shafts extending outside of the tube or box and a scale associated with said shafts for determining the relative rotation of said strips.

22. A device for measuring X-rays, comprising an opaque tube or box provided in its wall with an opening, a screen extending across said opening, coaxially disposed, annular measuring-strips of the character set forth adapted to pass in front of said screen in edge-to-edge relation, gear-wheels associated with and independently rotating said strips and provided with actuating-shafts extending outside of the tube or box, one of said shafts being made hollow and the other shaft extending therethrough, and turning disks on the end of said shafts, one of which is provided with a scale, and the other with an indicator coöperating therewith.

23. A device for measuring X-rays, comprising an opaque tube or box provided in its wall with an opening, a screen extending across said opening, two disks in front of said opening, each carrying an annular measuring-strip of the character set forth and arranged to pass in edge-to-edge relation in front of the screen, two rotative beveled gears attached one to each disk, a shaft extending at right angles to the axes of said disks and provided with a beveled gear-wheel which meshes with the gear-wheel of one of the disks, and a tubular shaft surrounding said last-mentioned shaft and provided with a beveled gear-wheel which meshes with the beveled gear-wheel of the other disk, said shafts extending outside of the tube or box and provided with hand-disks for rotating the same.

24. A device for measuring X-rays, comprising an opaque tube or box provided in its wall with an opening, a screen extending across said opening, two disks in front of said opening, each carrying an annular measuring-strip of the character set forth, and arranged to pass in edge-to-edge relation in front of the screen, two rotative beveled gears attached one to each disk, a shaft extending at right angles to the axes of said disks and provided with a beveled gear-wheel which meshes with the gear-wheel of one of the disks, a tubular shaft surrounding said last-mentioned shaft and provided with a beveled gear-wheel which meshes with the beveled gear-wheel of the other disk, said shafts extending outside of the wall of the tube or box and provided with hand-disks for rotating the same, and a spring-pressed means for retaining said beveled gear-wheels in meshing relation.

25. A device for measuring X-rays, comprising an opaque tube or box provided in its wall with an opening, a screen extending across said opening, two disks in front of said opening, each carrying an annular measuring-strip of the character set forth and arranged to pass in edge-to-edge relation in front of the screen, two rotative beveled gear-wheels attached one to each disk, a shaft extending at right angles to the axes of said disks and provided with a beveled gear-wheel which meshes with the gear-wheel of one of the disks, a tubular shaft surrounding said last-mentioned shaft and provided with a beveled gear-wheel which meshes with the beveled gear-wheel of the other disk, said shafts extending outside of the wall of the tube or box and provided with hand-disks for rotating the same, and means acting endwise on said shafts for maintaining said gear-wheels in mesh and serving also as a brake to prevent accidental rotation of said shafts and the disks.

In testimony that I claim the foregoing as my invention I affix my signature, in presence of two witnesses, this 18th day of January, A. D. 1904.

TOMAS PROCTOR HALL.

Witnesses:
WILLIAM L. HALL,
SANFORD E. BROWN.